United States Patent [19]

Garcia, Jr. et al.

[11] Patent Number: 4,911,527

[45] Date of Patent: Mar. 27, 1990

[54] FIBER OPTICS INPUT DEVICE

[75] Inventors: Felix Garcia, Jr., Round Rock; Rodney D. Williams, Plano, both of Tex.

[73] Assignee: Texas Instruments Incorporated, Dallas, Tex.

[21] Appl. No.: 385,941

[22] Filed: Jul. 25, 1989

Related U.S. Application Data

[63] Continuation of Ser. No. 287,696, Dec. 20, 1988, abandoned, which is a continuation of Ser. No. 188,119, Apr. 25, 1988, abandoned, which is a continuation of Ser. No. 848,068, Apr. 4, 1986, abandoned.

[51] Int. Cl.$^4$ ............................................. G02B 6/04
[52] U.S. Cl. ........................... 350/96.24; 250/227.14; 350/96.10
[58] Field of Search ............... 350/96.10, 96.24, 96.27; 250/227

[56] References Cited

U.S. PATENT DOCUMENTS

| | | | |
|---|---|---|---|
| 3,043,910 | 7/1962 | Hicks, Jr. | 350/96.27 X |
| 3,240,106 | 3/1966 | Hicks, Jr. | 250/227 X |
| 3,538,312 | 11/1970 | Genahr | 350/96.24 X |
| 3,892,468 | 7/1975 | Duguay | 350/96.24 |
| 3,991,318 | 11/1976 | Duguay | 350/96.24 X |

OTHER PUBLICATIONS

"Light Beam Matrix Input Terminal", Betts et al, IBM Technical Disclosure Bulletin, vol. 9, No. 5, Oct. 1966, pp. 493 to 494.

Primary Examiner—John D. Lee
Assistant Examiner—Phan T. Heartney
Attorney, Agent, or Firm—Melvin Sharp; James T. Comfort; Carl H. Hoel

[57] ABSTRACT

A fiber optics input device receives a light beam from a movable light source relative to the input device for providing input signals to a terminal. The device includes a single plane of parallel, clad optical fibers forming columns of a matrix and another similar single plane forming rows, the two planes being placed together to form the matrix. The cladding is removed from the top surface of each fiber to form a window therein to permit the light beam to directly contact the selected window in the column plane and to permit the light beam that passes the column plane optical fibers to enter the window of the row plane. Light sensors are connected to the ends of the optical fibers in both the column and row planes so that a first signal is generated indicating a column position and a second signal is generated indicating a row position, thereby fixing the intersection of the column and row optical fibers at the point where the light beam impinges. At least one more similar single vertical position plane may be positioned adjacent and below the row plane. This vertical position plane has at least one light detector connected to the ends of the optical fibers and provides a signal responsive to the light beam that passes the column and row planes indicative of the vertical position of the light source with respect to the input device.

21 Claims, 3 Drawing Sheets

FIBER OPTICS INPUT DEVICE

This application is a continuation of application Ser. No. 287,696 filed Dec. 20, 1988, now abandoned, which is a continuation of application Ser. No. 188,119, filed Apr. 25, 1988, which is a continuation of application Ser. No. 848,068, filed Apr. 4, 1986, now abandoned.

BACKGROUND OF THE INVENTION

1. Field of the Invention

This invention relates to an optical input device for a digital computer or terminal, but more particularly to a device made up of optical fibers forming a matrix to receive a light beam to indicate the position of the light beam as moves relative to the input device.

2. Description of the Prior Art

Prior art input devices include the mechanical mouse which involve wheels or rollers which maintain frictional contact with a surface. There are certain mechanical problems which are inherent with these mice, such as the problem in maintaining good frictional contact with a surface. If a mechanical mouse encounters a slippery portion of a surface, the resulting output signal will be inaccurate. Furthermore, a mechanical mouse uses a relatively large number of close tolerance parts and is difficult to make in mass production. Moreover, it is subject to mechanical "noise", such as lash and vibration, and requires frequent cleaning.

Another prior art input device is the joy stick control which includes a level, usually connected to a bearing. As the lever is moved and the bearing is rotated correspondingly, the bearing motion is sensed by potentiometers corresponding to different directions of bearing rotation. The output signal from a joy stick may be used for the same purpose as the output signal from a mouse. Both may be used to control a cursor. The distinguishing feature of a mouse is that two-dimensional motion over a surface corresponds directly with two-dimensional motion of a cursor in a graphic display.

More recently, optomechanical mice have been employed. As is the case with the mechanical mouse, the optomechanical mouse rolls a track ball over a surface in sense movement. Unlike the mechanical mouse, however, it incorporates optical encoders to measure distance. In the optical system, a shaft couples the movement to optical discs that interrupt a light beam as the ball moves. The design of the encoder wheel determines the resolution of the device.

More recently, optical mice have been used to input digital computers. This device must move over a pad with a special checker-board-pattern surface to gauge motion. The mouse contains one or two light-emitting diodes whose light shines onto the checker-board-pattern as the mouse moves. A mirror in the mouse shines light reflected from the surface into a light detector. The detector translates the light patterns into pulse trains that indicate motion. That indication of motion controls a cursor.

The fiber optics input device has advantages over any of these prior art devices:

1. There is no physical contact needed to activate the device and therefore there is no contact wear.
2. The fiber optics input device provides a non-electrical pad that is insensitive to electromagnetic and radio frequency fields, has a wide transmission bandwidth with low transmission loss, and eliminates any danger of combustion or sparking.
3. It is simple in design and therefore is of lower cost.
4. It is highly reliable.
5. It may be isolated in a hostile environment, including explosive fumes, high temperature, and high humidity.
6. It may be structured to measure distance from the light source to the device.

BRIEF SUMMARY OF THE INVENTION

This invention involves input from a light source that provides a light beam that in turn strikes the fiber optics input device causing a signal indicative of the location of the light beam to be output to a digital computer or terminal. In addition to the X and Y dimensions, the invention allows for positioning in the Z dimension as well.

A single plane of parallel, clad optical fibers forms the columns of a matrix. A single plane of parallel clad optical fibers forms the rows of a matrix. These two planes are connected together, so that the column and row optical fibers are orthogonal with respect to each other. The column and row light sensors are attached to the ends of the column and row optical fibers, respectively.

In this preferred embodiment, both the column and row optical fibers are made up of groups of equal numbers of optical fibers, the corresponding optical fiber in each group being connected together to activate a single light sensor when the light beam strikes any one of the corresponding optical fibers. This configuration permits fixing an intersection without the need for a single light sensor at the end of each of the column and row optical fibers.

The cladding at the top surface of the optical fibers of both planes is removed to form windows for reception of the light beam. That is, the light beam is received directly by the column windows and indirectly after is passes the column optical fibers, by the row windows.

At least one more single plane of parallel, clad optical fibers may be connected underneath the row plane. The optical fibers of this plane have their cladding removed from the upper surface to form windows which will receive the light beam after it has passed the column and row planes. This plane is a vertical position plane that provides a signal indicative of the distance that the light source is from the top surface of the column plane. This input device, therefore, provides for three dimensions differentiated from the customary two dimensional input devices.

An important object of this invention is to provide an input device for a digital computer or terminal that employs a light beam as an input that tracks the motion of the light beam in three dimensions.

Another object of this invention is to provide an input device for a digital computer or terminal that requires no physical contact for activation so that there is no wear.

Still another object of this invention is to provide an input device for a digital computer or terminal that is highly reliable, simple in design, and low in cost.

A further object of this invention is to provide an input device for a digital computer or terminal that is adaptable to a hostile environment including explosive fumes, high temperature and high humidity.

These and other objects will be made evident in the detailed description that follows.

DETAILED DESCRIPTION OF THE INVENTION

Figure 1:
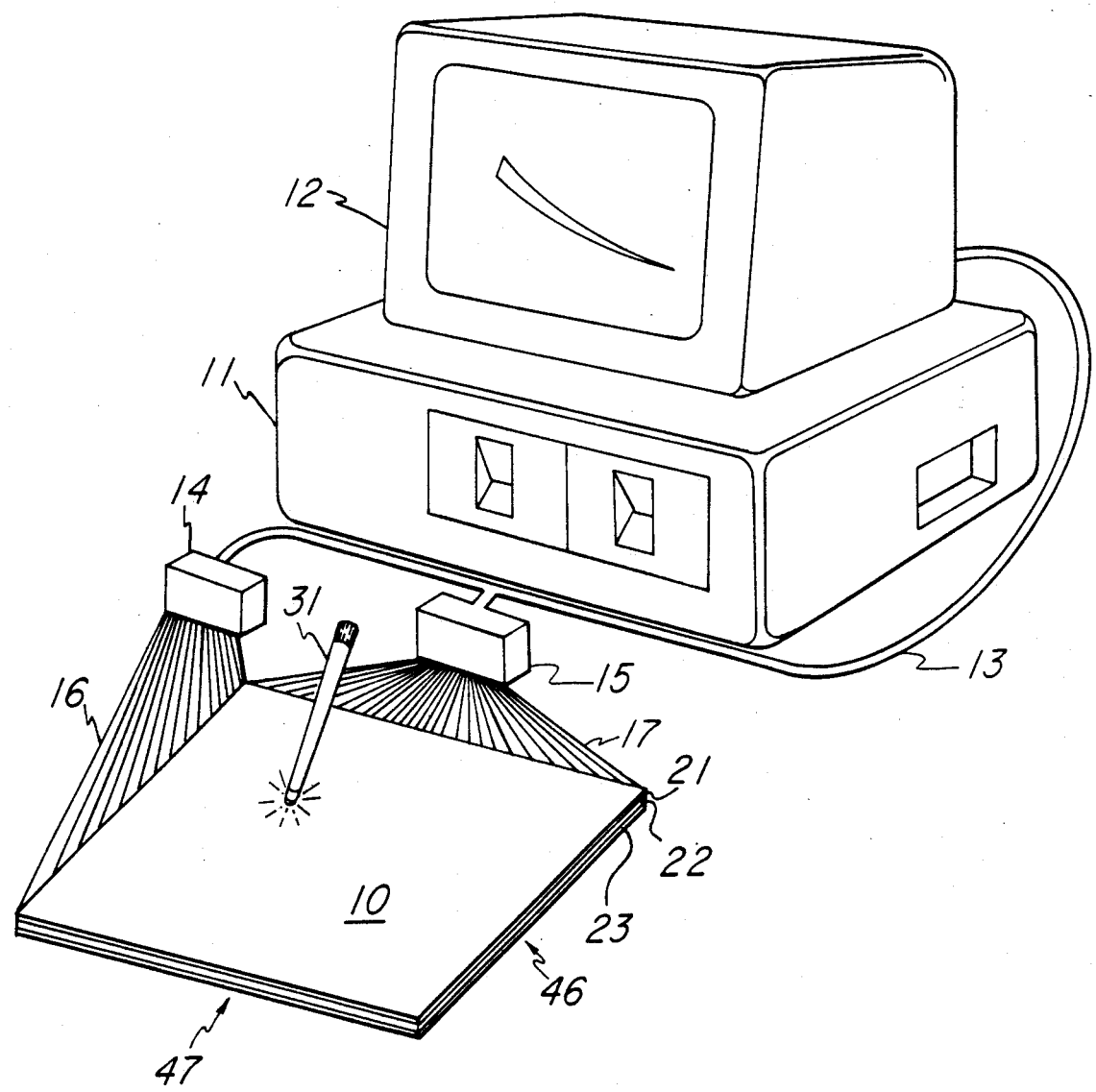
FIG. 1 is a perspective view of the fiber optics input device connected to data handling apparatus.

FIG. 1 illustrates a fiber optics input device 10 connected to personal computer 11 having display 12. Computer 11 and display 12 may be any of the personal computers available, such as the Professional Computer of Texas Instruments Incorporated. A personal computer is shown but any terminal or other computer, with appropriate interfacing, could be connected to the fiber optics input device 10.

Fiber optics input device 10 is shown made up of column plane 21, row plane 22 and vertical position plane 23. Light pen 31 is shown as it emits light to the column plane 21. Optical fibers 16 interconnect row plane 22 with junction box 14. Optical fibers 17 interconnect column plane 21 and vertical position plane 23 with junction box 15. The output from junction boxes 14 and 15 are joined together in optical fiber cable 19 which is connected to computer 11.

Junction boxes 14 and 15 house Texas Instruments Type TIL-414 phototransistors, in this preferred embodiment. In another embodiment, junction boxes 15 and 15 house Texas Instruments Type TC-202 CCD image sensors. Further, in this preferred embodiment, vertical position plane 23 has all of its fibers connected to a single phototransistor in junction box 15. The phototransistors and CCD imagers are, of course, simply design choices, the imager not limited to the types listed. Reflectors 46 and 47 are positioned at the ends of the planes to maximize efficiency.

Figure 2:
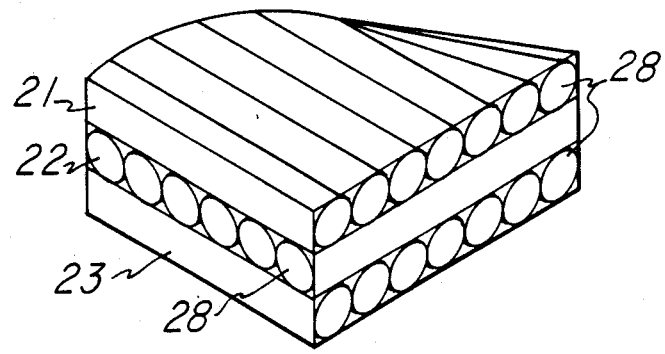
FIG. 2 illustrates a perspective section of the invention illustrating the optical fibers in the column, row and vertical position planes.

FIG. 2 illustrates a section of device 10. Planes 21, 22 and 23 are shown, each made up of optical fibers 28.

Figure 3:
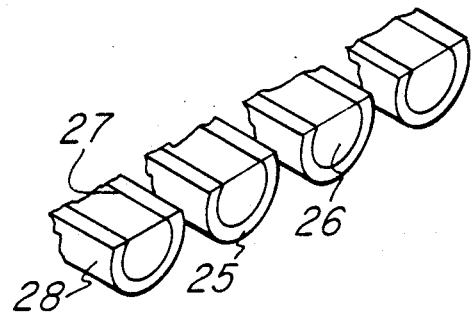
FIG. 3 perspectively illustrates the fibers having windows formed therein.

FIG. 3 shows optical fibers 28 having windows 27 formed therein by removing the top surface of cladding 25 to expose the actual optical fiber 26. Except for FIG. 3, the optical fibers shown in the drawings are illustrated as being completely circular for ease of illustration.

Figure 4:
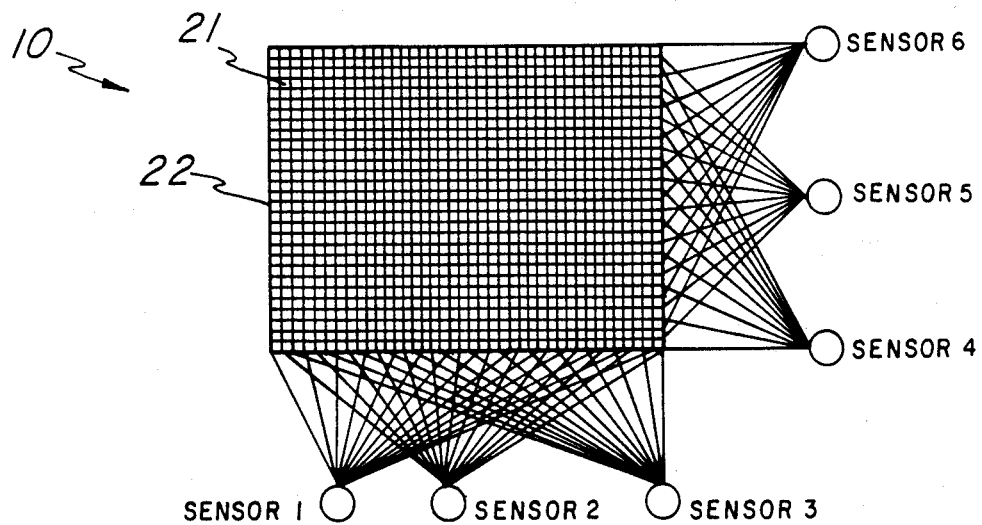
FIG. 4 is a plan view of the column and row planes and six sensors connected thereto.

FIG. 4 shows the column plane 21 and row plane 22 connected to sensors 1, 2 and 3, and sensor 4, 5, and 6, respectively. As indicated earlier, in this preferred embodiment, the sensors are phototransistors arranged as shown for the matrix translation. Typically, optical fiber 26 is an all-glass fiber having an inner core diameter of 100 microns while the cladding 25 diameter is typically 140 microns. By using fibers of 0.0018 inch diameter, a resolution of 308,025 pixels per square inch may be obtained.

Figure 5:
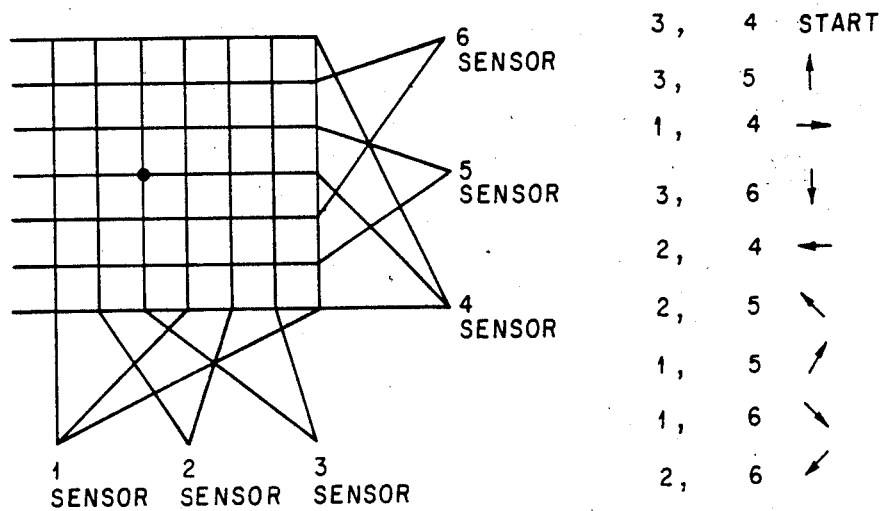
FIG. 5 illustrates the preferred mode of indicating the direction of movement of the light source.

FIG. 5 illustrates the preferred manner of tracking the light beam from light pen 31. Starting at intersection 3, 4 as shown, moving upwardly to intersection 3, 5 is a movement upward as indicated by the arrow, such motion of direction being translated, if desired, to move a cursor from the screen of display 12. Moving from intersection 3, 5 to 1, 4 is a motion to the right as indicated by the arrow, again translatable to moving a cursor in the same direction. All of the possible motions are shown in FIG. 5.

Figure 6:
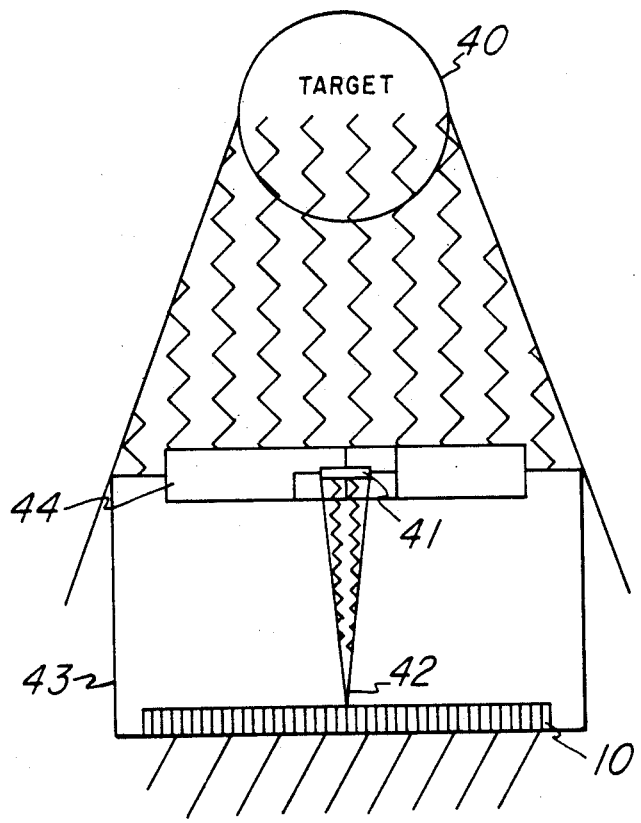
FIG. 6 schematically illustrates an embodiment for tracking a light emitting target.

FIG. 6 illustrates another embodiment of this invention where a target 40 such as a star or planet is to be tracked. The light from the planet strikes lens 41 which is held in place in gimbal 44. Lens 41 focuses the light to focal point 42 which then impinges on fiber optic sensing device 10. Gimbal support 43 holds gimbal 44 in position relative to device 10. In this manner, the movement of such a target may be monitored.

PREFERRED MODE OF OPERATION

Referring to FIG. 1, light from light pen 31 strikes column plane 21. Referring to FIG. 3, the light enters through window 27, striking optical fiber 26. The light then is conducted longitudinally to the ends of optical fiber 26. The removal of cladding 25 shown in FIG. 3 is exaggerated for illustration. In fact, keeping the width of window 27 substantially equal to the diameter of the light beam from source 31 aids in the efficiency of the system.

The light beam also travels between and around the optical fibers 28 of the column plane 21 and into similar windows of optical fibers 28 in row plane 22. Likewise, light from the light beam travels down into vertical position plane 23 and enters windows 27. In all cases, the light then travels longitudinally through the fibers 26 to the end thereof.

FIG. 4 illustrates the connection of sensor 1 through 6 and FIG. 5 schematically illustrates the translation. That is, a start position is indicated by the light beam from source 31 and when the source is moved, the indication of motion as shown in FIG. 5 is applied, for example, to a cursor. Computer 11 has storage facility for storing one position and comparing it with the new position to determine the direction of motion of the light beams.

Vertical position plane 23 has all of its optical fibers connected together, input to a phototransistor. The vertical position plane transistor defines a vertical dimension above the device which causes the phototransistor to turn off. For much finer tuning, additional vertical position planes can be added with the transistor thresholds adjusted as required.

Those skilled in the art may use other light sensors and light sources such as lasers, plastic optical fibers, etc., all without departing from the scope and spirit of this invention which is limited only by the appended claims.

What is claimed is:

1. A fiber optics input device adapted to receive a light beam from a light source that is movable relative to the input device, for providing input signals to data handling means, comprising:
   (a) column optical fibers including a plurality of spaced apart, parallel, clad optical fibers in a single plane forming columns of a matrix, having a longitudinal section of the cladding removed from the top surface of each fiber, forming a first window therein, to permit the light beam to directly contact the column optical fibers and to be conducted therein;
   (b) row optical fibers, including a plurality of parallel clad optical fibers in a single plane forming rows of a matrix, having a longitudinal section of the cladding removed from the top surface of each fiber to form a second window therein, the row optical fibers being positioned adjacent and below the column optical fibers with the rows orthogonal to the columns to form a matrix, the second windows receiving that part of the light beam that passes between the column optical fibers, to be conducted therein;

(c) column light detecting means connected to the ends of the column optical fibers for providing a signal responsive to the conducted light, indicative of the column position of the light beam; and (d) row light detecting means connected to the ends of the row optical fibers for providing a signal responsive to the conducted light, indicative of the row position of the light beam, thereby fixing the intersection of the column and row optical fibers where the light beam impinges.

2. The input device of claim 1 wherein each first window is of a width that is substantially equal to the diameter of the light beam.

3. The input device of claim 2 wherein each second window is of a width that is substantially equal to the diameter of the light beam.

4. The input device of claim 1, further including scanning means, the column and row light detecting means comprising light sensors that are sequentially turned on by the scanning means.

5. The input device of claim 4 wherein the light sensors comprise phototransistors.

6. The input device of claim 5 wherein the column and row optical fibers comprise a plurality of groups of equal numbers of optical fibers, the corresponding optical fibers in each group being connected together to activate a single phototransistor when the light beam strikes any one of the corresponding optical fibers.

7. The input device of claim 6 wherein the data handling means include storage means connected to the outputs of the phototransistors for storing a first position indicia that is compared with a current position indicia to determine the relative direction of motion of the light source from the first position to the current position.

8. A fiber optics input device adapted to receive a light beam from a light source that is movable relative to the input device, for providing input signals to data handling means, comprising:

(a) column optical fibers including a plurality of parallel, clad optical fibers in a single plane forming columns of a matrix, having a longitudinal section of the cladding removed from the top surface of each fiber, forming a first window therein, to permit the light beam to directly contact the column optical fibers and to be conducted therein;

(b) row optical fibers, including a plurality of parallel, clad optical fibers in a single plane forming rows of a matrix, having a longitudinal section of the cladding removed from the top surface of each fiber to form a second window therein, the row optical fibers being positioned adjacent and below the column optical fibers with the rows orthogonal to the columns to form a matrix, the second windows receiving that part of the light beam that passes the column optical fibers, to be conducted therein;

(c) column light detecting means connected to the ends of the column optical fibers for providing a signal responsive to the conducted light, indicative of the column position of the light beam; and (d) row light detecting means connected to the ends of the row optical fibers for providing a signal responsive to the conducted light, indicative of the row position of the light beam, thereby fixing the intersection of the column and row optical fibers where the light beam impinges;

(e) vertical position optical fibers including at least one plurality of parallel, clad optical fibers in a single plane, having a longitudinal section of the cladding removed from the top surface of each fiber to form a third window therein, the vertical position optical fibers being positioned adjacent and below the row optical fibers, the third windows receiving that part of the light beam that passes the column and row optical fibers to be conducted therein; and (f) vertical position light detecting means connected to the ends of the vertical position optical fibers for providing a signal responsive to the conducted light indicative of the vertical position of the light source with respect to the input device.

9. The input device of claim 8 wherein each third window is of a width substantially equal to the diameter of the light beam.

10. The input device of claim 9 wherein the vertical position light detecting means comprises a single phototransistor.

11. A fiber optics input device comprising, in combination:

(a) a first group of coplanar, parallel, clad optical fibers, each said optical fiber having a portion of the cladding removed from the upper surface thereof;

(b) a second group of coplanar, parallel, clad optical fibers, each said optical fiber of said second group having a portion of the cladding removed from the upper surface thereof, said fibers of said second group being positioned closely adjacent said fibers of said first group and being orthogonal thereto;

(c) column light detecting means coupled to said first group of optical fibers for providing a signal indicative of light travelling in a predetermined one of said fibers in said first group; and (d) row light detecting means coupled to said second group of optical fibers for providing a signal indicative of light travelling in a predetermined one of said fibers in said second group.

12. The device of claim 11 wherein the fibers of said first group are spaced apart to permit light to travel therebetween.

13. The device of claim 12, further including a third group of coplanar, parallel, clad optical fibers, each said optical fiber of said third group having a portion of the cladding removed from the upper surface thereof, said fibers of said third group being position closely adjacent said fibers of said second group and orthogonal thereto and means for providing a signal indicative of the fiber in said third group having light travelling therein.

14. The device of claim 13 wherein said groups are secured together in a single package.

15. The device of claim 12 wherein said groups are secured together in a single package.

16. The device of claim 11, further including a third group of coplanar, parallel, clad optical fibers, each said optical fiber of said third group having a portion of the cladding removed from the upper surface thereof, said fibers of said third group being positioned closely adjacent said fibers of said second group and orthogonal thereto and means for providing a signal indicative of a fiber in said third group having light travelling therein.

17. The device of claim 16 wherein said groups are secured together in a single package.

18. The device of claim 11 wherein said groups are secured together in a single package.

19. An optical position detector, comprising:
   (a) a first layer of clad optical fibers with the cladding removed from portions of the fibers in said first layer,
   (b) a second layer of clad optical fibers with the cladding removed from portions of the fibers in said second layer, said second layer adjacent said first layer, and the fibers in said second layer oriented to cross the fibers in said first layer; and
   (c) at least one light sensor coupled to at least one of the ends of said fibers of said first layer and at least one light sensor coupled to at least one of the ends of said fibers of said second layer;
   (d) whereby the position of a difference from background in light intensity impinging said first and second layers is determined by said light sensors sensing light entering said fibers of said first layer and said fibers of said second layer through said unclad portions.

20. The detector of claim 19, further comprising:
   (a) a third layer of clad optical fibers with the cladding removed from portions of the fibers in said third layer, said third layer adjacent said second layer;
   (b) at least one light sensor coupled to at least one of the ends of said fibers of said third layer.

21. The detector of claim 19, wherein:
   (a) said at least one light sensor coupled to at least one of the ends of said fibers of said first layer comprises a light sensor for each fiber in said first layer; and
   (b) said at least one light sensor coupled to at least one of the ends of said fibers of said second layer comprises a light sensor for each fiber in said second layer.

* * * * *